Patented Aug. 12, 1924.

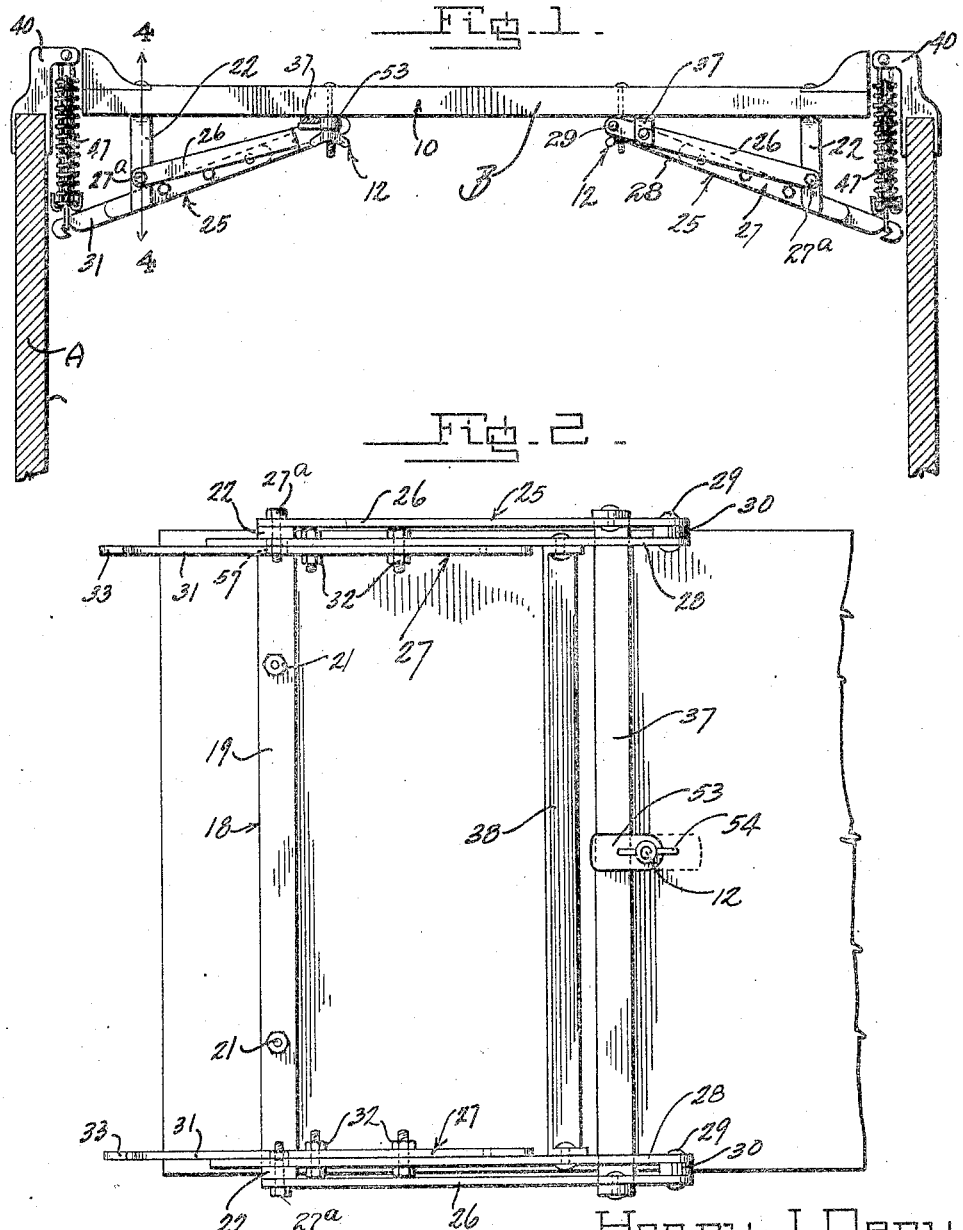

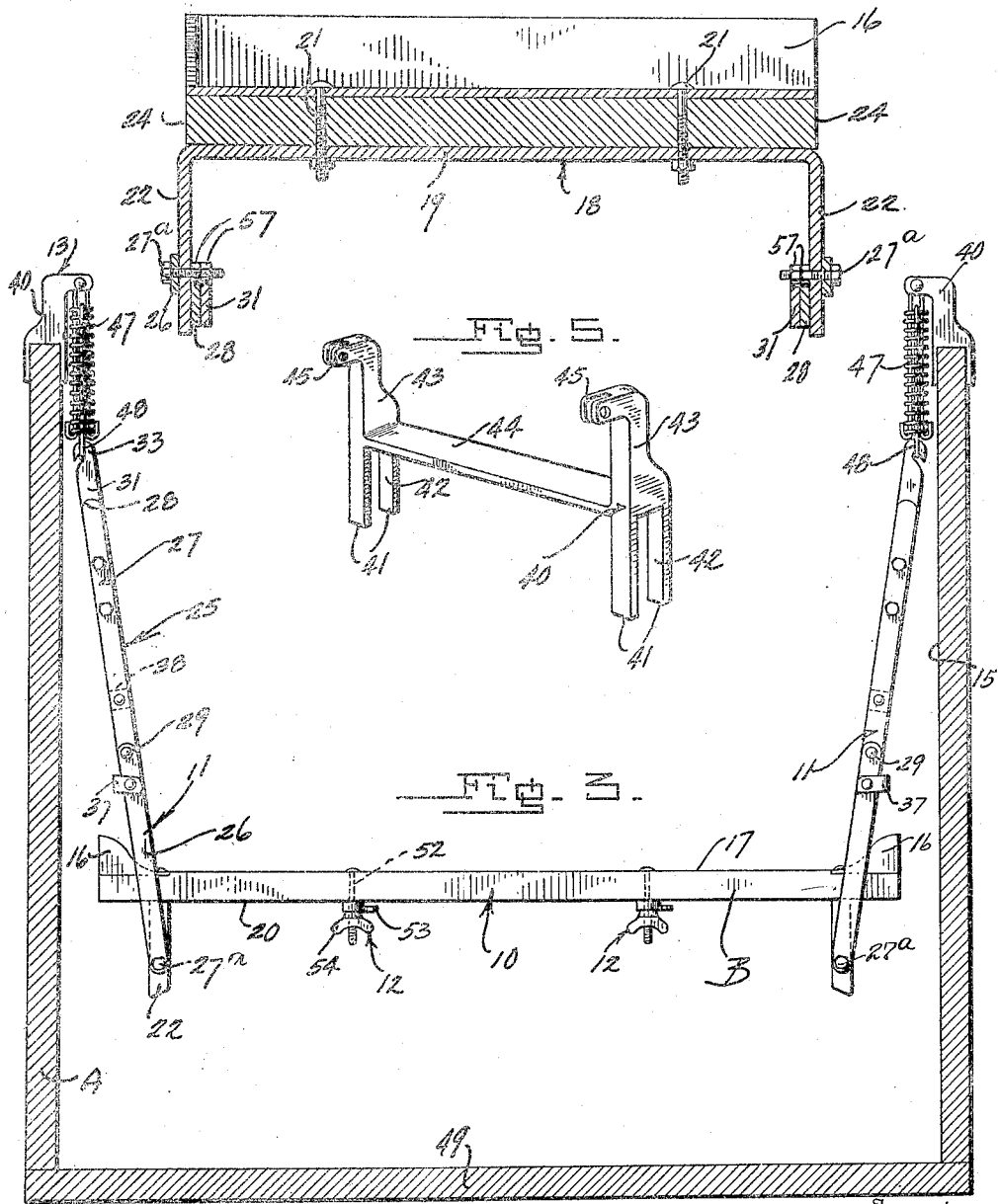

1,505,011

UNITED STATES PATENT OFFICE.

HENRY J. DERY, OF SANBORN, NORTH DAKOTA.

ADJUSTABLE SEAT ARRANGEMENT FOR VEHICLE BODIES.

Application filed May 15, 1922. Serial No. 561,100.

*To all whom it may concern:*

Be it known that I, HENRY J. DERY, a citizen of the United States, residing at Sanborn, in the county of Barnes and State of North Dakota, have invented certain new and useful Improvements in Adjustable Seat Arrangements for Vehicle Bodies, of which the following is a specification.

This invention relates to improvements in seating apparatus for vehicle bodies of relatively great depth, such as box bodies of wagons and bodies for grain wagons.

The primary object of the invention is the provision of a seat which may be raised or lowered with respect to a vehicle body of relatively great depth, whereby the vehicle driver or occupant may comfortably occupy the vehicle, independent of the amount of material contained within the vehicle body.

A further object of the invention is the provision of a seat which may be conveniently adjusted with respect to a vehicle body, including an improved supporting arrangement, which may be extended for positioning the seat adjacent the floor of the vehicle body, or which may be collapsed in facile manner to elevate the seat at a considerable distance from the floor of the vehicle body, such as when the vehicle body is loaded.

A further object of the invention is the provision of an adjustable seat arrangement of the above mentioned character, which is relatively simple in construction, easy of operation, which may be positioned to support a driver at different elevations with respect to the vehicle body to insure an easy riding position.

Other objects and advantages will be apparent during the course of the following detailed description.

In the accompanying drawings, forming a part of this specification, and wherein similar reference characters designate corresponding parts throughout the several views.

Figure 1 is a rear elevation, partly in cross section, showing the manner in which the improved seating arrangement may be elevated upon a vehicle body.

Figure 2 is an enlarged fragmentary bottom plan view of one end of a seating arrangement, showing the means by which the same may be supported, said means being shown folded upon the seat structure, as the same would appear during the elevation of the seating arrangement as is illustrated in Figure 1.

Figure 3 is a rear elevation of the seating arrangement showing the same in a lowered position within the chamber of a vehicle body.

Figure 4 is a transverse cross sectional view taken on the line 4—4 of Figure 1.

Figure 5 is a perspective view, showing a bracket arrangement used for connection of the seating arrangement to a vehicle body.

In the drawings, wherein for the purpose of illustration is shown the preferred embodiment of my invention, the letter A designates the vehicle body, upon which the improved seating arrangement B is to be mounted. The seating arrangement B preferably comprises the seat member 10; collapsible supporting arrangement 11; clamping means 12 for cooperation with the collapsible supporting means 11; and means 13 for resiliently supporting the seat member 10 through the collapsible supporting means 11.

The vehicle body A may, of course, conform to any shape of body which may be attached to a wagon or motor vehicle. As is illustrated in the drawings, this vehicle body A is of rectangular formation, to form the chamber 15 for receiving any material to be transported. The shape of the body A instead of being of box formation, may be of the type adapted for receiving grain and wherein the sides are of irregular and tapered formation.

Referring to the seating arrangement B, the seat member 10 thereof is preferably of rectangular formation, and of less width than the width of the chamber 15, so that said seating member 10 may be elevated or lowered in the chamber 15 of the body A. The ends of the seat member 10 may be provided with the retaining blocks 16 extending upwardly from the top surface 17, in order that a cushion element may be disposed upon the seat member 10, or to otherwise provide for the convenience of the occupants of the seat member.

One of the collapsible supporting means 11 is mounted at each end of the seat member 10, and which includes a U-shaped supporting bracket 18 which is transversely disposed with respect to the seat member 10, so that the bight portion 19 thereof is in engagement with the bottom surface 20 of the seat member 10, and securely attached thereto as by bolt members 21 extending upwardly through the thickness of the seat member 10 as can readily be seen in Figure 4 of the drawings. In this manner, the legs 22 and 23 of the U-shaped member 18 extend outwardly from the bottom surface 10 of the seat member, substantially at right angles to the plane defined by said seat member; said bight portion 19 being of such width as to permit the outer surfaces of the legs 22 and 23 to extend beyond the marginal edges 24 of the seat 10.

Collapsible arms 25 are pivotally attached to the legs 22, so that each of said collapsible supporting means includes a pair of said collapsing arms 25. Each of the collapsing arms 25 includes a bar portion 26, which is directly pivoted as by a bolt member 27ª to the outer surface of a leg 22 of the bracket member 18, so that said bar portion 26 may swing freely below and above the seat member 10. Each collapsible arm 25, furthermore includes an extensible bar section 27, which includes a portion 28, directly connected at an end to the free end of the bar portion 26 as by a pivot member 29. A washer 30 is preferably disposed intermediate the bar portion 26 and the portion 28, so that they are held in spaced relation. Each extensible section 27, furthermore includes a bar portion 31 which is adjustably connected to the bar portion 28 and outwardy thereof, as by the detachable bolt elements 32. The reason for the extensible section 27 will be more fully set forth hereinafter. The outer end of the bar portion 31 is provided with a hooked end 33, adapted for cooperation with the resilient supporting means 13.

In order to effectively brace the collapsible arms 25, which are mounted upon the same end of the seat member 10, transverse braces 37 and 38 are provided, respectively riveted or otherwise connected to the bar portions 26 and 28. It is to be noted that the brace 38 is relatively shorter than the brace 37, and that the extensible sections 27 are disposed inwardly of the outer bar portions 26.

Referring to the resilient supporting means 13, the same includes a bracket 40, which may be of cast metal, having attaching feet 41 thereon, to provide sockets 42 for receiving the upper marginal edges of the vehicle body A. The brackets 40 are, of course, disposed upon each side of the vehicle body A and include a pair of spaced uprights 43, connected by a reinforcing piece 44, which, in fact, rests upon the upper margin of the vehicle side upon which the bracket 40 is attached. The uprights 43 are each provided with a bifurcated end 45, extending inwardly from the vehicle sides, and adapted for supporting a compression spring arrangement 47, of durable arrangement. As can be seen from Figures 1 and 3 of the drawings, the springs 47 will be suspended from the brackets 40 upon each of the sides of the vehicle body A to extend partially into the chamber 15. Each of these spring arrangements 47 are provided with a hooked end 48 adapted to receive the hook end 33 of the bar portions 31.

In operation, when the chamber of the vehicle body A is empty, it will be the most convenient arrangement to have the seat member 10 disposed adjacent the floor 49 of the vehicle body A. The advantage of this arrangement is well known to those skilled in the use of box bodies of vehicles, since sometimes they are of great depth. When the vehicle body A is empty, the arms 25 will be unfolded, so that the extensible sections 27 align with their cooperating bar portions 26, substantially as is illustrated in Figure 3 of the drawings. In this manner, the bar portions 26 can be so swung as to extend upwardly from the seat member 10, so that the hook ends 33 of the extensible sections 27 may engage the hooked ends 48 of the spring members 47, and whereby the seating arrangement B may be suspended interiorly of the chamber 15 in secure and compact manner.

When it is desired to use the seat arrangement B after the chamber 15 of the vehicle body A has been filled with material, it can be seen that it will be necessary to elevate the member 10 accordingly. To this end, the collapsible supporting means 11, upon each end of the seat member 10 are folded beneath the seat member, substantially as is illustrated in Figure 1, whereby the arm portions 26 extend substantially parallel with their cooperating sections 27. In this relation, the cross brace 37 lies flush against the bottom 20 of the seat member 10. In order that the collapsible arms 25 may hold this relation, the clamping device 12 are provided, for securing the brace 27 in secure engagement against the seat member 10.

The devices 12 each include a bolt 52 which extends through the seat member 10 to have the screw threaded end thereof extended below the bottom surface 20. A jaw 53 is slidably mounted upon this screw threaded bolt end and is adjustable longitudinally of the bolt by a wing nut 54. In order to secure the cross piece 37 in the relation above described, it is merely necessary to swing the jaw 53 so that the same engages a side thereof, and upon adjustment of the clamping nut 54, the jaw 53 may be tightened to hold the cross piece 37 in the relation illustrated in Figures 1 and 2 of the drawings, and whereby the arms 25 are held in collapsed relation below the seat member 10. Of course, the end 53 may be detached from the hook end of the spring elements 47, in order to secure such adjustment. In this manner, the seat member 10 may be resiliently supported in an elevated position, upwardly of the vehicle body A, and as is well illustrated in Figure 1 of the drawings. It is to be noted that the bar portions 28 and 31 of each extensible section 27 engages the adjusting nuts 57, which are provided for clamping the pivot bolt 27 in position. In this matter, the various portions of the collapsible arms 25 may be folded into such a position that the hook ends 33 of each of the collapsible arms 25 may engage the springs 47 within the chamber 15, although the plane of the seat member 10 is disposed upwardly from said chamber 15.

From the foregoing, it can be seen that a seating arrangement has been provided, which may be adjusted within a vehicle body of relatively great depth to suit the convenience of occupant of the vehicle. By reason of the extensible section 27, the bars 31 thereon may be adjustably affixed to extend the length of the collapsible arm 25, so that the improved seating arrangement may be attached to grain vehicles, the width of which are ordinarily greater at the upper marginal edges thereof than the type of vehicles having box bodies.

Various changes in the shape, size and arrangement of parts may be made to the form of invention herein shown and described, without departing from the spirit of the invention or the scope of the claims.

I claim:

1. In a seat structure, the combination with a vehicle body, of a seat member, collapsible supporting arms pivotally connected to said seat member, means resiliently connecting said arms at their free ends to said vehicle body, and clamping means upon said seat member for maintaining the supporting arms collapsed thereon, whereby said seat may be supported in elevated position from said vehicle body.

2. In a seating arrangement, the combination of a seat member, a pair of supporting arms pivotally connected to the seat member at each end thereof, brace bars connecting each pair of arms intermediate their ends, and clamping means adapted for detachable engagement with said brace bars to foldably position said supporting arms upon said seat member.

3. A seating arrangement comprising a seat member, a supporting arrangement connected at each end of said seat member, each of said supporting arrangements comprising a pair of collapsible arms, each of said collapsible arms comprising a bar portion pivoted to said seat member and an extensible section pivotally connected to the free end of said bar portion, a brace connected to the collapsible arms upon each end of said seat member, and clamping devices mounted upon said seat member adapted for detachably engaging said brace whereby the collapsible arms may be maintained in folded relation upon said seat member.

4. A device of the class described comprising a seat member; substantially U-shaped brackets connected upon the bottom surface at each end thereof to have legs extending outwardly from the plane of said seat member; collapsible supporting arms connected to each leg of said supporting bracket, each of said arms including a portion directly pivoted to the leg of said bracket, and an extensible section pivotally connected upon the free end of said portion, said extensible section comprising a pair of bars; and bolt means for securing said pair of bars in a determined relation; a transverse brace secured to the first mentioned portion of each of said collapsible arms adjacent the free ends thereof; and a brace member connected between the extensible sections of said detachable arm upon each end of said seat member.

5. In a device of the class described, the combination with a vehicle body, of a seat member, brackets mounted upon each end of said member to extend below the same, collapsible supporting arrangements, means pivotally connecting said collapsible supporting arrangements to the brackets upon said seat member at points remote from said seat member, clamping means for detachably securing said supporting arrangements in folded relation below said seat members whereby the same may be braced against the means which pivotally connects them to said brackets, and means connecting the free ends of said supporting arrangements to the vehicle body.

6. A seat construction for vehicle bodies comprising an elongated seat member, collapsible supporting means at each end of the seat, each of said collapsible supporting means including a section pivoted to the seat and a second section pivoted to the free end of the first section, said supporting means of the seat being collapsible longitudinally of the seat, and means whereby the supporting means may be held in such collapsed relation upon the seat.

7. A seat construction for vehicles comprising a seat member, supporting means at each end of the member including a section pivoted to the seat member, and a second section pivoted at the free end of the first section, means for resiliently supporting the free ends of the second sections from the vehicle body at all times, and means whereby the supporting means may be clamped in collapsed relation upon the seat.

8. In a seat structure the combination with a vehicle body, of a seat member, extensible supporting arms pivotally connected to the seat member adjacent the outer ends of the seat, means for connecting the arms to the vehicle body, and clamping means beneath the seat member intermediate the ends thereof adapted to receive the extensible supporting arms for collapsing them beneath the seat whereby they may support the seat from said vehicle body in a different elevation than when extended.

HENRY J. DERY.